United States Patent
Guo et al.

(10) Patent No.: US 10,526,424 B2
(45) Date of Patent: Jan. 7, 2020

(54) METHOD FOR PREPARING HIGH PERFORMANCE TREAD RUBBERS THROUGH FILLER SILYLATION REACTION CATALYZED IN SITU BY IONIC LIQUIDS

(71) Applicants: SOUTH CHINA UNIVERSITY OF TECHNOLOGY, Guangdong (CN); BEIJING UNIVERSITY OF CHEMICAL TECHNOLOGY, Beijing (CN); JIAXING BEIHUA POLYMER ADDITIVES CO., LTD., Zhejiang (CN); BEIJING RED AVENUE INNOVA CO., LTD., Beijing (CN)

(72) Inventors: Baochun Guo, Guangdong (CN); Jing Huang, Guangdong (CN); Zhenghai Tang, Guangdong (CN); Liqun Zhang, Guangdong (CN); Yonglai Lu, Guangdong (CN); Minli Sun, Guangdong (CN); Qinghua Zhang, Guangdong (CN); Ning Zhang, Guangdong (CN); Dong Dong, Guangdong (CN)

(73) Assignees: SOUTH CHINA UNIVERSITY OF TECHNOLOGY, Guangdong (CN); BEIJING UNIVERSITY OF CHEMICAL TECHNOLOGY, Beijing (CN); JIAXING BEIHUA POLYMER ADDITIVES CO., LTD., Zhejiang (CN); BEIJING RED AVENUE INNOVA CO., LTD., Beijing (CN)

( * ) Notice: Subject to any disclaimer, the term of this patent is extended or adjusted under 35 U.S.C. 154(b) by 71 days.

(21) Appl. No.: 15/567,976

(22) PCT Filed: Apr. 20, 2016

(86) PCT No.: PCT/CN2016/079803
§ 371 (c)(1),
(2) Date: Oct. 20, 2017

(87) PCT Pub. No.: WO2016/169484
PCT Pub. Date: Oct. 27, 2016

(65) Prior Publication Data
US 2018/0142042 A1 May 24, 2018

(30) Foreign Application Priority Data
Apr. 22, 2015 (CN) .......................... 2015 1 0193681

(51) Int. Cl.
| | |
|---|---|
| C08C 4/00 | (2006.01) |
| C08K 5/435 | (2006.01) |
| C08L 7/00 | (2006.01) |
| C08L 9/00 | (2006.01) |
| B60C 1/00 | (2006.01) |
| C08K 3/04 | (2006.01) |
| C08K 3/22 | (2006.01) |
| C08K 3/34 | (2006.01) |
| C08K 3/36 | (2006.01) |
| C08K 5/14 | (2006.01) |
| C08K 5/18 | (2006.01) |
| C08K 5/3437 | (2006.01) |
| C08K 5/5415 | (2006.01) |

(Continued)

(52) U.S. Cl.
CPC .............. *C08C 4/00* (2013.01); *B60C 1/0016* (2013.01); *C08K 3/04* (2013.01); *C08K 3/22* (2013.01); *C08K 3/346* (2013.01); *C08K 3/36* (2013.01); *C08K 5/14* (2013.01); *C08K 5/18* (2013.01); *C08K 5/3437* (2013.01); *C08K 5/435* (2013.01); *C08K 5/548* (2013.01); *C08K 5/549* (2013.01); *C08K 5/5415* (2013.01); *C08L 7/00* (2013.01); *C08L 9/00* (2013.01); *B01J 31/0277* (2013.01)

(58) Field of Classification Search
CPC ..... C08C 4/00; C08L 9/00; C08L 7/00; C08K 3/04; C08K 3/22; C08K 3/346; C08K 3/36; C08K 5/14; C08K 5/18; C08K 5/3437; C08K 5/435; C08K 5/5415; C08K 5/548; C08K 5/549; B60C 1/0016
USPC ......................................... 524/572
See application file for complete search history.

(56) References Cited

U.S. PATENT DOCUMENTS

| | | | | |
|---|---|---|---|---|
| 2004/0177907 | A1* | 9/2004 | Steiner ...................... | B60C 1/00 152/209.5 |
| 2012/0202929 | A1* | 8/2012 | Iizuka ................... | B60C 1/0016 524/99 |
| 2014/0171565 | A1* | 6/2014 | Wiedemeier .............. | B60C 1/00 524/186 |

FOREIGN PATENT DOCUMENTS

| | | |
|---|---|---|
| CN | 101831093 | 9/2010 |
| CN | 102656222 | 9/2012 |

(Continued)

OTHER PUBLICATIONS

"International Search Report (Form PCT/ISA/210)", dated Jul. 19, 2016, with English translation thereof, pp. 1-6.

*Primary Examiner* — Hui H Chin
(74) *Attorney, Agent, or Firm* — JCIPRNET

(57) ABSTRACT

The present invention discloses a method for preparing high-performance tread rubber through a filler silylation reaction catalyzed in situ by an ionic liquid. The method is as follow: adding a gum rubber, a filler, a silane and an ionic liquid successively into an open mill or an internal mixer for mixing to obtain a rubber compound; high-temperature remilling the rubber compound; adding a vulcanizing package and an anti-aging agent into the remilled rubber compound at room temperature; and vulcanizing the rubber compound to obtain a vulcanized rubber.

8 Claims, No Drawings

(51) Int. Cl.
    *C08K 5/548*     (2006.01)
    *C08K 5/549*     (2006.01)
    *B01J 31/02*     (2006.01)

(56) References Cited

FOREIGN PATENT DOCUMENTS

| | | |
|---|---|---|
| CN | 103275365 | 9/2013 |
| CN | 103897405 | 7/2014 |
| CN | 104804231 | 7/2015 |
| DE | 102011001658 | 10/2012 |
| PL | 392207 | 2/2012 |

\* cited by examiner

METHOD FOR PREPARING HIGH PERFORMANCE TREAD RUBBERS THROUGH FILLER SILYLATION REACTION CATALYZED IN SITU BY IONIC LIQUIDS

CROSS-REFERENCE TO RELATED APPLICATION

This application is a 371 application of the international PCT application serial no. PCT/CN2016/079803, filed on Apr. 20, 2016, which claims the priority benefit of China application no. 201510193681.2, filed on Apr. 22, 2015. The entirety of each of the above-mentioned patent applications is hereby incorporated by reference herein and made a part of this specification.

TECHNICAL FIELD

The present invention relates to a preparation method of ionic liquid-modified high performance tread rubber, and specifically relates to a method for preparing the high performance tread rubber through a filler silylation reaction catalyzed in situ by an ionic liquid.

BACKGROUND OF THE PRESENT INVENTION

High performance tire characterized by "fuel-efficiency, high security and high durability" has become a major development direction in tire industry. Incorporation of silica into a tread rubber may significantly enhance wet-traction and reduce rolling resistance of the tire. Silica has become an essential filler in high performance tread rubber. In order to further improve the performance of the tread rubber containing silica, a silylation treatment, especially for sulfur-containing silane, is often used in the manufacture of tire tread rubber. Through such treatment, interfacial property between silica and rubber can be significantly improved. However, an amount of the sulfur-containing silane widely used in the industry is quite high (for example, 10 wt % relative to silica). It is well-known that silylation reactions between the silane and the filler are very complicated, including not only condensation reactions between alkoxy groups and surface hydroxyl groups (such as silanol groups) of the filler, but also hydrolysis reactions and condensation reactions among the alkoxy groups, which results in a very low silylation efficiency. Not only an excessive amount of the silane increases manufacturing costs, but side reactions related to the silane affect the performance of the rubber, and controllability of an interfacial structure becomes poor as well. So far, there's no effective method for reducing the amount of silane or enhancing use efficiency of the silane in the manufacture of the tread rubber. Therefore, exploring a methodology that effectively catalyzes the silylation reaction in the tread rubber is expected to greatly enhance the use efficiency of silane and the controllability of the structure, and hence to improve the interfacial performance of rubber composite materials and dispersion of the filler. Thus dynamic performance of the tread rubber is effectively improved. This method possesses important theoretical significance and practical significance for the manufacture of the high-performance tire.

Ionic liquids refer to ionic molten salts having a melting point below 100° C. and they have been greatly used in many fields such as green solvents, catalysis and electro-chemistry. Depending on different central atoms and substituent groups, cations of the ionic liquid substantially belongs to an onium salt. Owing to an interaction between polar groups of the ionic liquid and surface hydroxyl groups of silica (such as hydrogen-bond interaction), the cations of the ionic liquid can be adsorbed to the surface of silica. Onium ions of the ionic liquid which are adsorbed to the surface of silica can activate the silanol groups through a charge effect, i.e. generating silanolate anions Generation of the silanolate anions is a prerequisite step for the condensation between siloxane and silanol group. Therefore, the silylation reaction between the siloxane and the filler can be significantly catalyzed by the ionic liquids.

SUMMARY OF THE INVENTION

The present invention is to provide a method for accelerating a reaction between silane and a filler, and a preparation method for preparing a high-performance tread rubber based on this effect. Based on flexibility of structure design of ionic liquids and their particular catalysis effect on a silylation reaction, a tread rubber material with excellent dynamic performance can be prepared by in situ catalysis effect in the present invention.

The present invention is realized by following technical solution:

a method for preparing a high-performance tread rubber through a filler silylation reaction catalyzed in situ by an ionic liquid, comprises following steps:

(1) adding a gum rubber, a filler, a silane and the ionic liquid successively into an open mill or an internal mixer for compounding to obtain a rubber compound;

(2) high-temperature remilling the rubber compound;

(3) adding a vulcanizing package and an anti-aging agent into the remilled rubber compound at room temperature; and (4) vulcanizing the rubber compound to obtain a vulcanized rubber.

In the above-said method, in step (1), the rubber compound has a rubber content of 32 wt % to 42 wt %, the filler includes carbon black and a light-colored filler, the light-colored filler accounts for 10 wt % to 100 wt % of all of the filler, an amount of the silane is 2 wt % to 10 wt %, relative to the light-colored filler, and an amount of the ionic liquid is 1 wt % to 8 wt %, relative to the light-colored filler.

In the above-said method, the gum rubber is a basic rubber of the tread rubber which consists of natural rubber and (or) solution-polymerized styrene-butadiene rubber and cis-polybutadiene rubber. Particularly, high cis-polybutadiene rubber is preferable, and an amount thereof accounts for 25 wt % to 35 wt % of the gum rubber.

In the above-said method, the filler includes carbon black and the light-colored filler; the light-colored filler is selected from a group consisting of silica, clay and a metallic oxide, or a mixture thereof; the light-colored filler is preferably silica; the silica is preferably highly-dispersible silica; and the silane is trialkoxysilane having functional groups, preferably with a general formula of sulfur-containing silane.

In the above-said method, the ionic liquid is an ionic molten salt with a melting point below 100° C., including dialkyl imidazoles, alkyl pyridines or organophosphorus salts, preferably organophosphorus salt ionic liquids.

In the above-said method, in step (1), time for the compounding is 5 to 10 minutes.

In the above-said method, in step (2), the high-temperature remilling is conducted in the open mill or in the internal mixer, at a temperature of 125° C. to 155° C. for 5 to 15 minutes.

In the above-said method, the vulcanizing package refers to a system of sulfur cooperating with a vulcanizing activator and an accelerator, or a system of peroxide cooperating with an activator, or a system of sulfur being combined with peroxide.

In the above-said method, the anti-aging agent includes one or more than one of p-phenylenediamines and quinolines.

In step (3), the vulcanizing package is a vulcanization system with sulfur as a major vulcanizing agent and sulfenamide as a major accelerator. Specific types and contents of the vulcanizing agent are determined according to practical requirements. The anti-aging agent refers to a common anti-aging agent in the tread rubber, preferably anti-aging agents such as p-phenylenediamines and (or) quinolines.

A working mechanism of the present invention is as follow: cations of the ionic liquid can activate surface hydroxyl groups (such as silanol groups) of the light-colored filler by a charge effect. Therefore, via this effect of the ionic liquid, a concentration of silanolate anions is effectively increased and efficiency of condensation between alkoxy groups and the silanol groups is greatly enhanced. With an effectively enhanced interfacial reaction, the dispersion of silica and interfacial interaction are enhanced, and therefore static mechanical performance (especially modulus) and dynamic mechanical performance of the vulcanized rubber can be significantly improved. Thus, a high-performance tread rubber material can be prepared by such method.

Compared with the traditional technologies, the present invention has following advantages:

(1) the present invention is in situ implemented during the processing of rubber, and no additional processing equipment or step is needed;

(2) owing to abundant structural diversity of the ionic liquids, the catalysis effect and the dynamic mechanical performance of the rubber in the present invention can be conveniently regulated by changing the structure of the ionic liquid;

(3) the method according to the present invention can reduce the amount of silane and cost, and substantially improve the dynamic mechanical performance of the tread rubber, with very extensive application prospect in manufacture of high-performance tire.

DETAILED DESCRIPTION OF THE PREFERRED EMBODIMENT

The present invention will be further described in detail below in combination with specific embodiments, but the implementations of the present invention are not limited to these. As for technological parameters which are not particularly specified, they can be implemented in accordance with conventional technology.

(1) Adding a gum rubber, a filler, a silane and an ionic liquid successively into an open mill for compounding for 10 minutes to obtain a rubber compound;

(2) high-temperature remilling the rubber compound;

(3) adding a necessary vulcanization system and an anti-aging system into the remilled rubber compound at room temperature; and (4) vulcanizing the rubber compound to obtain a vulcanized rubber.

In step (2), the high-temperature remilling was conducted in the open mill at a temperature of 145° C. for 8 minutes.

In step (4), the vulcanizing refers to vulcanization at 150° C. according to an optimum cure time in Table 2.

In order to verify advantages of the method according to the present invention, a formula for tire tread rubber using solution-polymerized styrene-butadiene rubber and cis-polybutadiene rubber as basic rubbers was chosen, and types and contents of different silanes and ionic liquids were chosen. A control sample and four embodiments were prepared according to the above-said method in the present invention. Specific formulas are shown as Table 1, wherein units in the table are all gram.

TABLE 1

Formulas for the comparative sample and the embodiments

| Formula | Control sample | Embodiment 1 | Embodiment 2 | Embodiment 3 | Embodiment 4 |
|---|---|---|---|---|---|
| SSBR (VSL4526-2HM), containing 30% of oil | 55 | 55 | 55 | 55 | 55 |
| SSBR (Sinopec Shanghai Gaoqiao Petrochemical Co., Ltd 2003) | 30 | 30 | 30 | 30 | 30 |
| Rare earth cis-polybutadiene (CB24) | 30 | 30 | 30 | 30 | 30 |
| Highly-dispersible silica (Utrasil 7000GR) | 50 | 50 | 50 | 50 | 50 |
| Carbon black (N375) | 20 | 20 | 20 | 20 | 20 |
| Silane (Si69) | 5 | 1 | 0 | 1 | 1 |
| Silane (Si75) | 0 | 0 | 1 | 0 | 0 |
| Zinc oxide | 3 | 3 | 3 | 3 | 3 |
| Stearic acid | 2 | 2 | 2 | 2 | 2 |
| Anti-aging agent 4010 | 2 | 2 | 2 | 2 | 2 |
| Paraffin | 1.5 | 1.5 | 1.5 | 1.5 | 1.5 |
| Accelerator NS | 1.8 | 1.8 | 1.8 | 1.8 | 1.8 |
| Accelerator TMTD | 0.3 | 0.3 | 0.3 | 0.3 | 0.3 |
| Sulfur | 2.3 | 2.3 | 2.3 | 2.3 | 2.3 |
| Hexadecyl triphenyl phosphonium chloride | 0 | 1 | 1.5 | 0 | 0 |
| N-butylpyridinium bis((trifluoromethyl)sulfonyl)imide | 0 | 0 | 0 | 1.5 | 0 |
| 1-methyl-3-nonylimidazolium tetrafluoroborate | 0 | 0 | 0 | 0 | 0.8 |

According to the corresponding China National Standards, properties of all formulas were tested, and typical performance thereof is listed in Table 2. As shown in Table 2, the method according to the present invention can significantly reduce rolling resistance (shown as tan delta at 60° C.) and heat build-up of the tread rubber, and significantly improve modulus of the vulcanized rubber. In the meantime, amounts of the silane in the formulas have been greatly reduced.

TABLE 2

Typical properties of the control sample and embodiments

| Test item | Control sample | Embodiment 1 | Embodiment 2 | Embodiment 3 | Embodiment 4 |
|---|---|---|---|---|---|
| Optimum cure time (min) | 17.5 | 14.3 | 10.5 | 11.4 | 13.5 |
| Tensile strength (MPa) | 20.2 | 21.7 | 21.5 | 22.0 | 20.6 |
| M300 (MPa) | 13.1 | 17.5 | 18.1 | 16.9 | 17.7 |
| Elongation at break (%) | 410 | 330 | 340 | 350 | 320 |
| Tan delta (60° C., strain 7%, 10 Hz) | 0.135 | 0.105 | 0.107 | 0.11 | 0.106 |
| Heat build-up (° C.) | 33 | 26 | 25 | 23 | 24 |
| Akron abrasion (cm$^3$/1.61 km) | 1.61 | 1.53 | 1.47 | 1.62 | 1.45 |

Above-mentioned embodiments of the present invention are examples only for clearly illustrating the present invention, but not for limiting the implementations of the present invention. For those ordinarily skilled in the art, other different forms of variation or alteration can also be made based on the above description. There's no need or no way for all the implementations to be exhaustive. Any modification, equivalent replacement and improvement made within the spirit and the principle of the present invention shall be comprised within the scope of protection of the claims of the present invention.

What is claimed:

1. A method for preparing a tread rubber through a filler silylation reaction catalyzed in situ by an ionic liquid, wherein the method comprises following steps:
    (1) adding a gum rubber, a filler, a silane and the ionic liquid successively into an open mill or an internal mixer for compounding to obtain a rubber compound, wherein the filler comprises a carbon black and a light-colored filler, wherein the light-colored filler is a silica, a clay a metallic oxide, or any combinations there of, and the silane is a sulfur-containing trialkoxysilane, the light-colored filler accounts for at least 10 wt % of all the filler, an amount of the silane is 2 wt % to 10 wt %, relative to the light-colored filler, and an amount of the ionic liquid is 1 wt % to 8 wt %, relative to the light-colored filler;
    (2) remilling the rubber compound at a temperature of 125° C. to 155° C. for 5 to 15 minutes;
    (3) adding a vulcanizing package and an anti-aging agent into the remilled rubber compound at room temperature; and
    (4) vulcanizing the rubber compound to obtain a vulcanized rubber.

2. The method according to claim 1, wherein in step (1), the rubber compound has a rubber content of 32 wt % to 42 wt %.

3. The method according to claim 1, wherein the gum rubber is a basic rubber for a tread rubber, the basic rubber consists of a natural rubber, a solution-polymerized styrene-butadiene rubber, and a high cis-polybutadiene rubber, and an amount of the high cis-polybutadiene accounts for 25 wt % to 35 wt % of the gum rubber.

4. The method according to claim 1, wherein the gum rubber is a basic rubber of a tread rubber, the basic rubber consists of a natural rubber and a cis-polybutadiene rubber, or a solution polymerized styrene-butadiene rubber and a cis-polybutadiene rubber, and an amount of the cis-polybutadiene accounts for 25 wt % to 35 wt % of the gum rubber.

5. The method according to claim 1, wherein the ionic liquid is an ionic molten salt with a melting point below 100° C., including dialkyl imidazoles, alkyl pyridines or organophosphorus salts.

6. The method according to claim 1, wherein in step (1), a time for the mixing is 5 to 10 minutes.

7. The method according to claim 1, wherein the vulcanizing package is a system of sulfur cooperating with a vulcanizing activator and an accelerator, or a system of peroxide cooperating with an activator, or a system of sulfur being combined with peroxide.

8. The method according to claim 1, wherein the anti-aging agent comprises one or more than one of p-phenylenediamines and quinolines.

* * * * *